| United States Patent [19] | [11] 3,947,379 |
| --- | --- |
| Feins | [45]*Mar. 30, 1976 |

[54] PROCESS FOR REDUCING NITROGEN OXIDES BY TREATING CATALYST SUPPORT AND A METAL NITRATE WITH UREA AND THEREAFTER CALCINING

[75] Inventor: Irvin Ralph Feins, Westport, Conn.

[73] Assignee: American Cyanamid Company, Stamford, Conn.

[ * ] Notice: The portion of the term of this patent subsequent to Dec. 10, 1991, has been disclaimed.

[22] Filed: Jan. 22, 1974

[21] Appl. No.: 435,554

Related U.S. Application Data

[63] Continuation-in-part of Ser. No. 330,166, Feb. 6, 1973, Pat. No. 3,853,788, Continuation-in-part of Ser. No. 330,167, Feb. 6, 1973, Pat. No. 3,872,030, Continuation-in-part of Ser. No. 330,169, Feb. 6, 1973, Pat. No. 3,853,791.

[52] U.S. Cl. .............................................. 252/463
[51] Int. Cl.² .......................................... B01J 21/04
[58] Field of Search ............. 252/465, 463; 208/216

[56] References Cited
UNITED STATES PATENTS

| 3,267,025 | 8/1966 | Gring et al. ........................ 208/136 |
| 3,471,399 | 10/1969 | O'Hara ............................... 208/216 |
| 3,528,797 | 9/1970 | Funk et al. ............................. 71/39 |

OTHER PUBLICATIONS

Kerns, Chemical Suppression of Nitrogen Oxides, I & EC Proc. Des. & Dev., Vol. 4, No. 3, pp. 263–265, July 1965.

*Primary Examiner*—W. J. Shine
*Attorney, Agent, or Firm*—William J. van Loo

[57] ABSTRACT

The use of urea in conjunction with calcination of catalyst materials containing sources of oxides of nitrogen results in suppression of oxides of nitrogen during such calcination and reduces air pollution formerly associated with such calcinations.

3 Claims, No Drawings

PROCESS FOR REDUCING NITROGEN OXIDES BY TREATING CATALYST SUPPORT AND A METAL NITRATE WITH UREA AND THEREAFTER CALCINING

This application is a continuation-in-part of application Ser. No. 330,166, filed Feb. 6, 1973, now U.S. Pat. No. 3,853,788; Ser. No. 330,167, filed Feb. 6, 1973; now U.S. Pat. No. 3,872,030; and Ser. No. 330,169, filed Feb. 6, 1973, now U.S. Pat. No. 3,853,791.

This invention relates to a process for reduction of oxides of nitrogen in exhaust fumes emanating from the calcination of catalyst materials containing nitrate salts. More particularly, the invention relates to such a process wherein at a point prior to calcination urea is added to the catalyst material which is to be calcined with a content of nitrate salt.

Much concern has been evidenced with respect to environmental pollution. A major source of air pollution arises from exhaust gases emanating from internal combustion engines such as used in automobiles. Another significant contributor to air pollution is the exhaust gas that emanates from combustion of heating oils used to provide home heating. Additional sources include the emissions from various industrial processes.

Considerable progress has been made with respect to exhaust gases from automotive exhausts and catalytic converters have been developed which are capable of reducing the noxious pollutants to safe levels. A significant contribution to this effort has been an effective, long-lasting catalyst material developed by the catalyst industry in conjunction with the automobile manufacturers. Similarly, improvements in the quality of heating oils by more effective refinement has made it possible to reduce pollutants arising from such source. Again, development of more effective catalysts by the catalyst industry has had a significant part in this effort. Thus, the catalyst industry has been making great strides in improving air quality in various areas.

In providing catalyst materials for various uses, a wide variety of materials and procedures are available. A particularly effective catalyst material is one which comprises a support or base material which is of large surface area and carries thereon one or more promoter materials of a type and in an amount that are effective for the catalytic reaction considered. These catalyst materials are conveniently made by separately preparing the support and thereafter promoting the support thus prepared. Alternative procedures are also used wherein at least partial promotion is effected in conjunction with support preparation.

A highly desirable type of material used to provide the support is an inorganic oxide such as alumina, silica, titania, magnesia, and the like. For many reactions, alumina or combinations of alumina and silica are greatly preferred. Useful inorganic oxides may occur in nature or may be obtained synthetically. Generally, a synthetic inorganic oxide is preferred because its physical properties for use as a support can be more effectively controlled.

In preparing an inorganic oxide for use as a support numerous preparative procedures are available so that preferred support properties for specific reactions can be provided. Generally, the desired inorganic oxide is precipitated from suitable soluble sources and then washed and dried. Depending upon the method of use contemplated, the inorganic oxide may also be formed into a desirable shape of suitable size and given a preliminary heat treatment such as calcination to set the shape and size. All of this processing may be accomplished without the use of nitrate salts or nitric acid and thus air pollution by oxides of nitrogen may be avoided in preparing the support materials. However, there also exist numerous instances in support preparation where it would be convenient to use sources of oxides of nitrogen, such as aluminum nitrate or nitric acid, if the problem of air pollution thereby did not exist.

After the catalyst support has been prepared, it is generally necessary to promote the support with suitable materials to provide the necessary activity and selectivity thereto. This can be conveniently accomplished by impregnating the support with solutions containing dissolved promoter sources. The impregnated support is then activated, usually by calcination, to convert the promoter source to the desired promoter material and to provide an effective catalyst material.

In some instances, it is possible to provide the final activated catalyst material without resort to nitrate salts or nitric acid and, therefore, avoid pollution problems associated with oxides of nitrogen. In other instances, however, it is not possible to prepare a specific catalyst material without resort to a source of oxides of nitrogen. In numerous instances, this is because the only available soluble promoter source is a nitrate source. In many instances, it is convenient to use a nitrate salt in promoter impregnations and recourse to other salts greatly increases production problems, generally requiring added steps and increased costs.

Thus, although the catalyst industry has contributed significantly in solving air polution problems associated with other industries it has been unable to solve air pollution problems within its own domain.

In accordance with the present invention, there is provided a process for calcination of a catalyst support having associated therewith a source of oxides of nitrogen which comprises treating said support prior to calcination with urea in an amount sufficient to suppress the oxides of nitrogen and thereafter calcining the thus-treated support.

The present invention provides a process which effectively reduces emissions of oxides of nitrogen to the atmosphere to safe levels without adversely affecting properties of the catalyst material being processed. The process eliminates the need for costly scrubbers normally employed to suppress emission of oxides of nitrogen but when used in association therewith will provide more effective suppression. Furthermore, the present invention enables use to be made of sources of oxides of nitrogen in catalyst preparation without the danger of exceeding safe limits of emission of oxides of nitrogen.

The copending applications to which the present application is a continuation-in-part are all directed to specific embodiments of urea usage wherein improved catalyst activities are obtained, regardless of whether or not sources of oxides of nitrogen are present. The present application is directed solely to the process of calcination wherein a source of oxides of nitrogen is present in the catalyst support being activated.

In I & EC Proc. Des. and Dev., Vol. 4, No. 3, pages 263–265 (July 1965), there is disclosed a process for the chemical suppression of nitrogen oxides when nitric acid is used as an oxidizing agent in reactions such as pickling, milling, and dipping of metal substrates. Urea is added to suppress formation of oxides of nitrogen. In use, however, urea nitrate is formed and precipitates from solution causing numerous problems and requiring use of excesses of urea. The article specifically points out that urea nitrate decomposes into urea and nitric acid at a temperature in excess of 300°F. Since calcination is carried out well in excess of 300°F., generally in the range of about 900° to 1100°F., it is completely unexpected that urea should be effective in suppressing oxides of nitrogen in a calcination process in view of the teachings of this reference.

In the U.S. Pat. No. 3,528,797, issued Sept. 15, 1970 to Funk et al. there is disclosed a process for chemical suppression of nitrogen oxides resulting from acidulation of phosphate rock with nitric acid. Urea is used in a scrubbing system or by direct addition to the acidulation mixture. The present invention is in an entirely non-analogous art and does not involve addition of urea to a scrubbing system or an acidulation mixture. Thus, in view of the specific teachings of the reference patent, it is completely unexpected that urea should be effective in the present process.

In carrying out the present invention, three essential requirements must be met:

1. The catalyst support must contain a source of oxides of nitrogen in the form in which it is to be activated;
2. The catalyst support must be treated with an effective amount of urea prior to calcination; and
3. The catalyst support with the contents indicated must be calcined.

As long as these three requirments are met, as far as is known, the present process, is effective. In view of the limited requirements of the present process, it is readily apparent that numerous variations in processing are possible while still achieving the desired suppression of oxides of nitrogen during calcination.

In carrying out the present invention, the catalyst materials are prepared in accordance with conventional procedures except that where previously sources of oxides of nitrogen were carefully avoided, in the present process they are employed as desired since provision for urea treatment of the catalyst support prior to calcination effectively suppresses the oxides of nitrogen. Thus, an inorganic oxide useful in providing a catalyst support is prepared in accordance with conventional procedures. If desired, provision can be made to incorporate promoter materials in the inorganic oxide as prepared and urea may also be incorporated to suppress any oxides of nitrogen that may arise from materials used in such preparation. The inorganic oxide support material may then be further processed to provide the desired support form with or without further promotion and use of urea in conjunction therewith.

It should be realized that urea is highly soluble in water, forming a 50 weight percent solution at 17°C. and being infinitely soluble in hot water. Accordingly, the point at which urea is employed in processing should ensure that it remains on the support material that is to be calcined. If multiple calcinations are to be employed, each involving potential liberation of oxides of nitrogen during calcination, urea treatment should be included prior to each calcination.

Although it is possible to employ the inorganic oxide gel as a catalyst support directly as prepared, dried, and calcined, it is generally preferred to prepare the support in particulate form having certain size and shape characteristics. In some instances, the support is conventionally prepared in the form of microspheres by control of the procedure by which the inorganic oxide gel is prepared. In other instances, the inorganic oxide in the form of a hydrogel is subjected to homogenization and extrusion to form particles of a defined length-to-width ratio. A variation of this procedure involves use of at least some xerogel as the inorganic oxide being processed by homogenization and extrusion. In any of these conventional procedures, provisions for promoter incorporation are generally carried out after forming of the support is complete, the form being set by drying and calcining the extrudates. Urea may be advantageously incorporated in the gel slurry being processed in the event oxides of nitrogen are to be evolved during calcination.

Alternatively, the inorganic oxide may be dried prior to being rendered into specific shape. Such drying may be in an oven or preferably by use of a spray dryer. Such drying generally does not give rise to oxides of nitrogen because it is generally carried out at temperatures below that at which significant decomposition of sources of oxides of nitrogen arises. The dried gels may then be formed in accordance with conventional procedures such as by mix-mulling, tabletizing, pelletizing, and molding. Processing of the dried gels may include provision for promoter incorporation, either partial or full, and urea usage will be dictated by the possibility of formation of oxides of nitrogen in the calcination step following forming. Formation of the dried gels into specific shape may be carried out without provision for promoter materials or, as indicated with only partial provision therefor. In those instances where the formed support is further treated with promoter sources, use of urea will suppress oxides of nitrogen and should be used in conjunction with promotion when appropriate. Use of urea may involve multiple applications or a single application, depending upon how many calcinations giving rise to oxides of nitrogen are contemplated.

The amount of urea that is to be employed in any given instance may vary widely but in any event should be sufficient to reduce the formation of oxides of nitrogen to safe levels. Usually, the source of oxides of nitrogen present is a nitrate salt. In the presence of water used in processing, the existence of nitric acid is possible. Nitric acid may be considered to decompose as follows:

$$4HNO_3 \rightarrow 2H_2O + 4NO_2 + O_2 \qquad (1)$$

$$4HNO_3 \rightarrow 2H_2O + 4NO + 3O_2 \qquad (2)$$

Combining equations (1) and (2) and simplifying one obtains: $2HNO_3 \rightarrow H_2O + N_2O_3 + O_2 (3)$. In the presence of water, one may rewrite equation 3 as follows: $2HNO_3 \rightarrow 2HNO_2 + O_2$ (4). The reaction of urea with nitrous acid is believed to be as follows:

$$2HNO_2 + H_2NCONH_2 \rightarrow 2N_2 + CO_2 + 3H_2O.$$

This reaction would tend to suggest that one mole of urea is equivalent to two nitrate ions. However, in use the amount of urea that will cause significant suppression of oxides of nitrogen upon calcination of a catalyst support containing a source thereof may vary from about 0.25 to 5 moles of urea per mole of nitrate ion present, preferably about 0.5 to 4 moles of urea, same basis. Generally, usage of an amount of urea below the range indicated will not provide adequate suppression of oxides of nitrogen. Usage of amounts of urea in excess of the range indicated is wasteful and provides no benefits over the usage specified.

Since urea is soluble in and compatible with most aqueous promoter solutions, it is generally preferred to use it in such manner. In some instances, the use of urea may aid in stabilizing or solubilizing the promoter ingredients in the aqueous medium. It is of course possible to add urea to the support material to be calcined in any method which does not interfere with establishing the proper promoter levels.

The present invention is directed to the specific use of urea in the calcination of catalyst materials which normally give rise to oxides of nitrogen that contribute to environmental pollution. Such use suppresses formation of oxides of nitrogen and thereby minimizes environmental pollution from such source. There is thus provided a significant advance in the field of catalyst preparation, which, in turn, has contributed notably in overcoming environmental pollution problems.

The invention is more fully illustrated by the examples which follow wherein all parts and percentages are by weight unless otherwise specified.

EXAMPLE 1

In 125 ccs. of water were dissolved 53.7 grams of $(NH_4)_2Mo_2O_7$ (ammonium dimolybdate). There were then added 26.5 grams of 86.3% $H_3PO_4$, followed by 36.5 grams of urea. A clear solution resulted in about 10 minutes and 88.5 grams of $Ni(NO_3)_2 \cdot 6H_2O$ were added. After 30 minutes of agitation a clear solution was obtained. The solution contains 4 moles of urea per mole of nitrate ion.

Calcined alumina extrudates formed into cylinders of 1/8 inch diameter from precipitated alumina and having a pore volume of 0.74 cc. per gram were employed as carrier. The solution prepared was diluted to 220 cc. and sprayed onto 300 grams of carrier. Spraying was effected on the extrudates revolving in a gallon jar using a pressurized spray gun. Spraying was for about 5 minutes and the extrudates were rotated for an additional hour. The wet extrudates were allowed to stand overnight and then dried at 480°F. for 2 hours. The dried pills were then calcined at 1200°F. for 1.5 hours. The extrudates had the composition 6% NiO, 12% $MoO_3$, 3.2%P, and balance alumina. No evolution of oxides of nitrogen occurred during calcination of the impregnated support.

COMPARATIVE EXAMPLE A

Following the procedure of Example 1 in every essential detail except that urea was omitted from the promoter solution, another catalyst material was prepared. Copious evolution of oxides of nitrogen occurred during calcination of the impregnated support.

The catalyst of Example 1 and Comparative Example A are hydrodesulfurization catalysts. When tested under identical conditions in such a process, the catalysts were found to be essentially equivalent in activity.

EXAMPLE 2

A muller mix was prepared employing a spray dried precipitated alumina powder and a promoter solution prepared as in Example 1. The mix was mulled for 35 minutes and extruded, dried, and calcined according to conventional procedures. The catalyst obtained was of substantially the same form and composition as that of Example 1.

COMPARATIVE EXAMPLE B

The procedure of Example 2 was repeated in every material detail except that the urea was omitted from the promoter solution.

The catalyst preparations of Example 2 and Comparative Example B were calcined in separate runs using a continuous calciner. Oxides of nitrogen were determined on samples taken from the calciner stack before the gases enter the scrubber. The calciner was operated at capacity over a two hour period during which a stack dilution fan which adds 4 to 6 volumes of air to the stack was in operation.

Brown vapors were evident in the stack when the catalyst of Comparative Example B was calcined. No brown vapors were detected in the stack when the catalyst of Example 2 was calcined.

During the run determinations of oxides of nitrogen were made using the Phenoldisulfonic Acid Method. The average values are as follows:

|  | No Urea | Urea |
|---|---|---|
| $NO_x$(ppm) | 647 | 192 |

We claim:

1. A process for the reduction of oxides of nitrogen in exhaust gases emanating from the calcination of a catalyst support having associated therewith a metal nitrate salt which comprises treating said support prior to calcination with urea in an amount which is from about 0.25 to about 5 moles per mole of nitrate ion present and thereafter calcining the thus-treated support without adversely affecting properties of the catalyst material being processed.

2. The process of claim 1 wherein said urea treatment is carried out by adding urea to an aqueous promoter solution containing at least one metal nitrate used to impregnate a formed support.

3. The process of claim 1 wherein urea treatment is carried out by adding urea to an aqueous promoter solution containing at least one metal nitrate and said promoter solution is added to a muller mix prepared from a spray dried precipitated alumina powder and said promoter solution, said muller mix being used to form the support.

* * * * *